United States Patent
Nakamura (10) Patent No.: US 7,139,148 B2
(45) Date of Patent: *Nov. 21, 2006

(54) RECORDING MEDIUM, RECORDING METHOD, AND RECORDING APPARATUS

(75) Inventor: Osamu Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/216,771

(22) Filed: Aug. 31, 2005

(65) Prior Publication Data

US 2006/0007575 A1    Jan. 12, 2006

Related U.S. Application Data

(63) Continuation of application No. 10/478,070, filed on Nov. 18, 2003, now Pat. No. 6,967,803.

(30) Foreign Application Priority Data

Mar. 19, 2002  (JP)  ............................. 2002-076218
Mar. 13, 2003  (JP)  ..................... PCT/JP03/03009

(51) Int. Cl.
  *G11B 15/18*  (2006.01)
  *G11B 5/02*  (2006.01)

(52) U.S. Cl. ........................ 360/72.1; 360/27

(58) Field of Classification Search ................ 360/72.1
  See application file for complete search history.

(56) References Cited

U.S. PATENT DOCUMENTS

| | | | |
|---|---|---|---|
| 4,819,092 A * | 4/1989 | Richards | ..................... 360/27 |
| 5,276,566 A | 1/1994 | Clifford, Jr. | |
| 5,719,721 A | 2/1998 | Iizuka et al. | |
| 6,038,094 A | 3/2000 | Matsumi et al. | |
| 6,201,654 B1 | 3/2001 | Okamoto et al. | |
| 6,967,803 B1 * | 11/2005 | Nakamura | ................. 360/72.1 |

FOREIGN PATENT DOCUMENTS

| | | |
|---|---|---|
| EP | 0 723 267 | 7/1996 |
| JP | 6-259891 | 9/1994 |
| JP | 0 649 136 | 4/1995 |
| JP | 7-115617 | 5/1995 |
| JP | 7-141605 | 6/1995 |
| JP | 7-143432 | 6/1995 |
| JP | 7-182603 | 7/1995 |
| JP | 8-63902 | 3/1996 |
| JP | 8-203216 | 8/1996 |

(Continued)

*Primary Examiner*—Wayne Young
*Assistant Examiner*—Jason Olson
(74) *Attorney, Agent, or Firm*—Frommer Lawrence & Haug LLP; William S. Frommer; Thomas F. Presson (57) ABSTRACT

When the data recording is performed on a magnetic tape in various recording densities, information relating to the recording density (recording-density related information) is recorded in the data recorded on the magnetic tape. Accordingly, recording and reproduction can be properly managed by referring to the recording-density related information, even if data in various recording densities are recorded on the same magnetic tape. Further, when the recording density is altered, the drive apparatus side switches over the recording density in accordance with the quality of recording data. Thus, in the case where the data writing is not possible due to a recording error, the recording density is switched over to a lower recording density to record the data without an error, and therefore a higher flexibility is provided to a data format to be recorded on the magnetic tape.

10 Claims, 9 Drawing Sheets

FOREIGN PATENT DOCUMENTS

| | | |
|---|---|---|
| JP | 8-306132 | 11/1996 |
| JP | 9-237469 | 9/1997 |
| JP | 2000-187944 | 7/2000 |
| JP | 2000-315346 | 11/2000 |

* cited by examiner

| Lower 4 Bits of Data Block Number | Contents of ID Information |
|---|---|
| 0000 | Partition Number |
| 0001 | Data Format |
| 0010 | Absolute Track Number (ATN) |
| 0011 | Append ATN |
| 0100 | Base Group Number |
| 0101 | Record Count |
| 0110 | Separator 1 Count |
| 0111 | Separator 2 Count |
| 1000 | Last ATN of Previous Group (LATNPG) |
| 1001 | GIT Size of Current Basic Group |
| 1010 ~ 1111 | Undefined |

| Recording Data | Group(N) | A | A | A | A | A | Group(N+1) | Group(N+2) |
|---|---|---|---|---|---|---|---|---|
| ID_INC | 0 | 0 | 0 | 0 | 0 | 0 | 0 | 0 |

FIG. 10B

Point of Successive Writing

| Recording Data | Group(N) | A | A | A | A | A | A | A | Group(N+1) | Group(N+2) |
|---|---|---|---|---|---|---|---|---|---|---|
| ID_INC | 0 | 0 | 0 | 0 | 0 | 0 | 0 | 0 | 0 | 0 |

FIG. 10C

Point of Successive Writing

| Recording Data | Group(N) | A | A | A | A | A | A | A | A | Group(N+1) | Group(N+2) |
|---|---|---|---|---|---|---|---|---|---|---|---|
| ID_INC | 0 | 0 | 0 | 0 | 0 | 0 | 1 | 1 | 1 | 1 | 1 |

RECORDING MEDIUM, RECORDING METHOD, AND RECORDING APPARATUS

This application is a Continuation of U.S. application Ser. No. 10/478,070, filed Nov. 18, 2003 now U.S. Pat. No. 6,976,803, which is hereby incorporated by reference in its entirety herein.

TECHNICAL FIELD

The present invention relates to a recording medium in which data are recorded on a magnetic tape, a recording method and a recording apparatus corresponding to the recording on the recording medium.

BACKGROUND ART

So-called tape streamer drives have been known as drive apparatuses capable of performing recording/reproduction of digital data on magnetic tape.

Such tape streamer drives have enormous storage capacities of, for example, from several tens to several hundreds of gigabytes, depending on the tape length of the tape cassette media. Consequently such drives are utilized in a wide range of applications, such as backups of the data recorded on the hard disk or other media of computers, and are also well-suited to storage of image and other data with large data sizes.

In such tape streamer drives, the magnetic tape is made to travel with the tape wound over a rotating drum through a predetermined wrap angle; in addition, the rotating drum is rotated, and by using a magnetic head on the rotating drum to perform recording/reproduction scanning using a helical scan method, high-density recording can be performed. Hence as is well known, data are recorded such that there are successive tracks in the length direction on the magnetic tape, formed so as to have a predetermined inclination angle with respect to the length direction.

Then, in the above tape streamer drives, a recording error may occur by reasons of, for example, a damage existed in an area on the magnetic tape or deterioration of S/N in recording data.

In such a case, for example, recording is retried and the recording of data is again carried out at the same recording position. Alternatively, the recording (rewrite) is newly performed on another area of the magnetic tape, while the area where the recording error occurred is treated as a dummy track (frame).

The above described method of performing retry or rewrite is effective when the recording error is caused by a damage, on the magnetic tape which is the recording medium. However, in the case where a recording error is caused by the deterioration of S/N itself, there is a high probability that the error occurs again when recording the data even after performing retry or rewrite, since the S/N itself of the recording data has not been improved. Accordingly, under the situation in which the S/N of the recording data is deteriorated, there may be a problem of difficulty in appropriately recording data by merely performing retry or rewrite.

DISCLOSURE OF THE INVENTION

In view of the above, as a recording medium in which data are recorded on a track unit basis, the present invention provides the recording medium in which tracks having various recording densities can be recorded and at least recording-density related information with respect to the recording density is recorded within each track.

Further, as a method for recording data onto the magnetic tape on a track unit basis, the present invention provides the recording method in which tracks having various recording densities can be recorded and at least recording density related information with respect to the recording density is recorded within each track.

Further, as a recording apparatus in which data are recorded onto the magnetic tape on a track unit basis, the present invention provides the recording apparatus including recording control means for recording tracks having various recording densities, and for recording at least recording density related information with respect to the recording density in each track.

Further, as a method for recording data onto the magnetic tape on a track unit basis by the helical scan method using rotary heads, the present invention provides the recording method, in which when the recording is performed, recording data judgment processing to judge the quality of recorded data and recording control processing to record the data on the magnetic tape by changing the recording density of the track in accordance with the judgment result in the recorded data judgment processing are; carried out.

Furthermore, in a recording apparatus in which data are recorded onto the magnetic tape on a track unit basis by the helical scan method using rotary heads, the present invention provides the recording apparatus that includes recorded data judgment means to judge the quality of the recorded data and recording control means to record data on the magnetic tape by changing the recording density of the tracks in accordance with, the judgment result in the recorded data judgment means when the recording is performed.

According to respective configurations as described above, when tracks having various recording densities are recorded on the magnetic tape, the recording-density related information which is information having requiring contents relating to the recording density of each track is recorded in each track. By means of the recording-density related information the data recorded on the magnetic tape in various recording densities are managed. In other words, this means that as a format of recording onto the magnetic tape data having various recording densities are permitted to be recorded.

Further, when the configuration in which the recording density of data is changed in accordance with the quality of the recording data is employed, it becomes possible to perform the data recording in more suitable recording density corresponding to the quality of the recording data.

BEST MODE FOR CARRYING OUT THE INVENTION

Hereinafter, an embodiment of the present invention will be explained with reference to the drawings.

Figure 1:
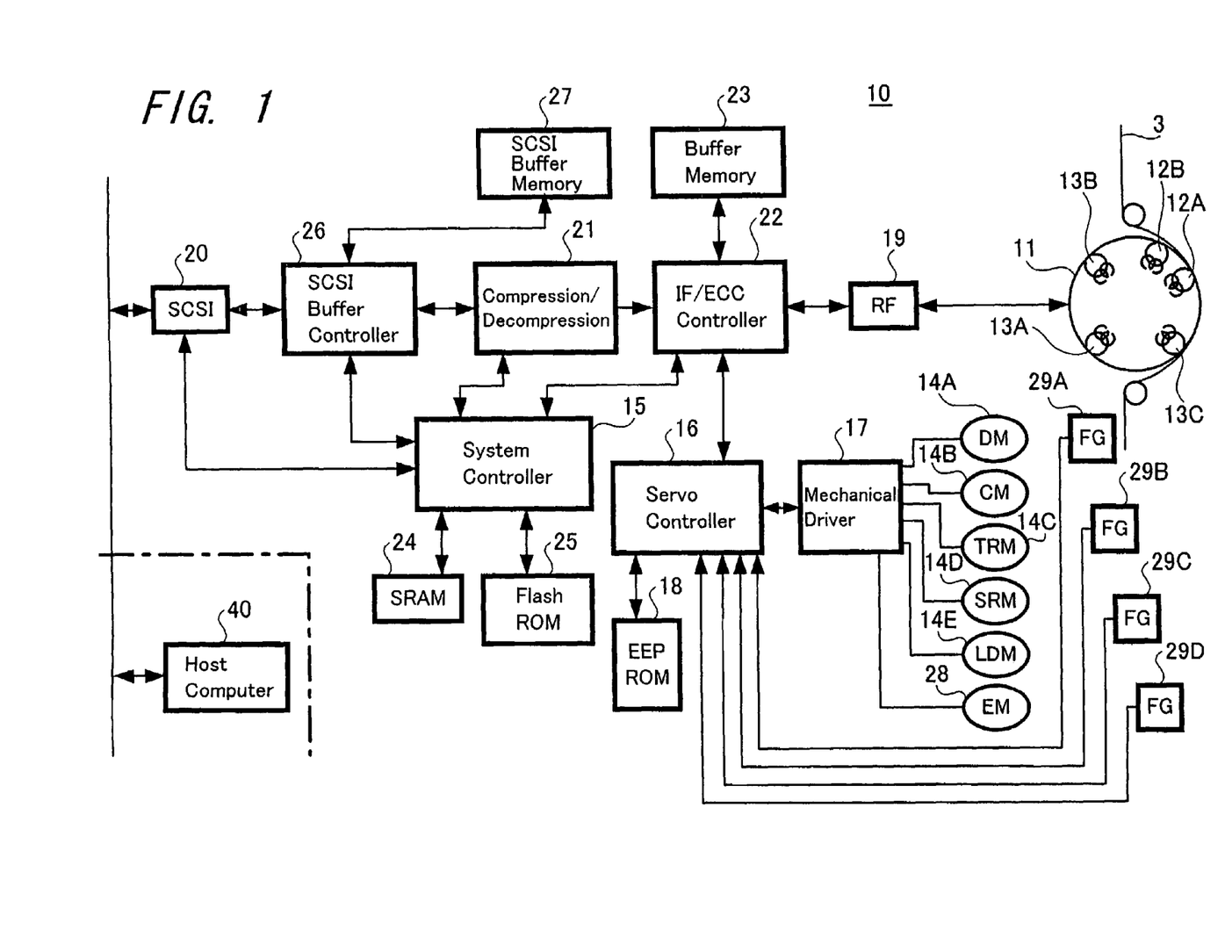
FIG. 1 is a block diagram showing an example of the configuration of a tape streamer drive corresponding to an embodiment of the present invention.

FIG. 1 shows an example of the configuration of a tape streamer drive corresponding to the embodiment of the present invention.

A tape streamer drive 10 shown in FIG. 1 is designed to perform recording and reproduction by the helical scan method on a magnetic tape 3 in a tape cassette not shown in the figure.

In this figure, a rotating drum: 11 is provided with, for example, two recording heads 12A and 12B and three reproducing heads 13A, 13B and 13C.

The recording heads 12A and 12B have a construction in which two gaps, with different azimuth angles, are positioned in close proximity. Also, the reproducing heads 13A, 13B and 13C each have predetermined azimuth angles.

The rotating drum 11 is rotated by a drum motor 14A, and the magnetic tape 3 drawn out of the tape cassette is wound around the rotating drum 11. Also, the magnetic tape 3 is fed by a capstan motor 14B and by a pinch roller, not shown in this figure. In addition, the magnetic tape 3 is wound around a pair of reels not shown in this figure; and the pair of the reels is driven by reel motors 14C and 14D to be rotated in forward and reverse directions, respectively.

A loading motor 14E drives a loading mechanism not shown in this figure to perform loading and unloading, the magnetic tape 3 onto and from the rotating drum 11.

An eject motor 28 is a motor which drives the tape cassette loading mechanism, and carries out seating engagement of the inserted tape cassette and ejecting operation thereof.

The drum motor 14A, the capstan motor 14B, the reel motors 14C and 14D, the loading motor 14E, and the eject motor 28 are each driven to rotate by electrical power applied from a mechanical driver 17. The mechanical driver 17 drives the respective motors based on the control of a servo controller 16. The servo controller 16 controls the rotation speed of the respective motors, to carry out the tape feed during normal recording and reproduction, high-speed tape feed during high-speed reproduction, tape feed during fast-forwarding or fast-rewinding mode and the other operations.

Further, in an EEP-ROM 18 constants and so on used by the servo controller 16 to perform servo control on the respective motors are stored.

In order for the servo controller 16 to perform servo control on the respective motors, an FG (frequency generator) is provided in each of the drum motor 14A, capstan motor 14B, T reel motor 14C, and S reel motor 14D, so that information on rotation of each motor can be detected. In other words, a drum FG 29A generating frequency pulses synchronized with the rotation of the drum motor 14A, a capstan FG 29B generating frequency pulses synchronized with the rotation of the capstan motor 14B, a T reel FG 29C generating frequency pulses synchronized with the rotation of the T reel motor 14C, and an S reel FG 29D generating frequency pulses synchronized with the rotation of the S reel motor 14D are formed, and outputs (FG pulses) thereof are supplied to the servo controller 16.

The servo controller 16 judges the rotation speed of each motor based on respective FG pulses, thereby detecting errors relative to the target rotation speed of each motor; and the servo controller 16 performs control on the mechanical driver 17 to apply electrical power corresponding to the amount of error to control the rotation speed by the closed-loop control. Accordingly the servo controller 16 can control each operation in the normal recording/reproduction mode, high speed searching mode, fast-forwarding mode, fast-rewinding mode, or the like such that the respective motors rotate at the target rotation speed corresponding to each operation.

Also, the servo controller 16 is bi-directionally connected, via an interface controller/ECC formatter 22 (hereinafter referred to as an IF/ECC controller), to a system controller 15 which performs control processing of; the entire system.

In the tape streamer drive 10, an SCSI interface 20 is used for the input, and output of data. For example, when data are recorded, the data are sequentially inputted from a host computer 40 via the SCSI interface 20 in transfer data units called fixed-length records, and are supplied to a compression/decompression circuit 21 via a SCSI buffer controller 26. The SCSI buffer controller 26 is designed to control the data transfer of the SCSI interface 20. An SCSI buffer memory 27 is buffer means which is provided corresponding to the SCSI buffer controller 26 in order to obtain a transfer rate of the SCSI interface 20. In addition, the SCSI buffer controller 26 supplies requiring command data to a remote memory interface which performs communication with a MIC (memory in cassette) not shown in this figure, and generates an operational clock with respect to the remote memory interface.

Further, in such a tape streamer drive system, there also exists a mode in which data are transmitted from the host computer 40 in a unit of aggregate data having variable length.

In the compression/decompression, circuit 21, if necessary, the compress ion processing is performed on the input data using a predetermined method. The output of the compression/decompression circuit 21 is supplied to the IF/ECC controller 22, and then under the control of the IF/ECC controller 22 the output of the compression/decompression circuit, 21 is temporarily, accumulated in a buffer memory 23. The data accumulated in the buffer memory 23 undergoes control by the IF/ECC controller 22, in which data are made to be ultimately handled as a unit called a 'group' having a, fixed data, length corresponding; to 40 tracks of the magnetic tape, and then the data are subjected to ECC formatting.

In the ECC format processing, error correction codes are appended to the recording data, and modulation processing is performed on the data to conform to the magnetic recording; and then the resultant data are supplied to a RF processor 19.

In the RF processor 19, such processing as amplification, recording equalizing, and the like is performed on the supplied recording data to generate a recording signal, which is supplied to the recorded 12A and 12B. Thus, recording of the data on the magnetic tape 3 is performed by the recording heads 12A and 12B.

Also, the data reproducing operation is briefly explained, in which the data recorded on the magnetic tape 3 are read as RF reproduction signals by the reproducing heads 13A, 13B, and 13C; and the reproduction output is subjected to reproduction equalizing, reproducing clock generation, binary conversion, decoding (for example Viterbi decoding), and the like by the RF processor 19.

The resultant signal read in this manner is then supplied to the IF/ECC controller 22 and is, subjected to error correction processing and the like. Then the data are temporarily accumulated in the buffer memory 23, and are read at a predetermined time to be supplied to the compression/decompression circuit 21.

In the compression/decompression circuit 21, based on the judgment by the system controller 15, data decompression processing is performed and then data are output, when the data have been compressed by the compression/decompression circuit 21 at the time of the recording processing; and the data are output from the compression/decompression circuit 21 without decompression processing, when the data have not been: compressed.

The output data from the compression/decompression circuit 21 are output, as the reproduction data to the host computer 40 via the SCSI buffer controller 26 and: SCSI interface 20.

In a S-RAM 24 and a flush ROM 25, data-used: by the system controller 15 to perform various processing are stored.

In the flush ROM 25, for example, constants and the like which are used for controls are stored. Further, the S-RAM 24 is used as a working memory and also as a memory used for storing and computing: management data of the tape cassette read from the MIC not shown in this figure, data to be written in the MIC, mode data set for each tape cassette, various flag data, and the like.

Also, in the flush ROM 25 programs to be executed by the system controller 15 are stored in addition to various data as firmware.

Furthermore, the S-RAM 24 and the flush ROM 25 may be configured as internal memory of a microcomputer constituting the system controller 15, or alternatively a configuration may be employed in which a portion of the buffer memory 23 is used as working memory.

As shown in FIG. 1, information is transmitted in both directions between the tape streamer drive 10 and the host computer 40 by using the SCSI Interface 20 as described above; to the system controller 15 the host computer 40 performs various communication using SCSI command.

Further, other data interfaces such as IEEE 1394 or similar than the SCSI interface may be employed.

Furthermore, the applicant of the present invention has previously proposed a configuration, in which a non-volatile memory capable of storing magnetic tape management information and the like is provided in a tape cassette so that a tape streamer drive can access the non-volatile memory by using a contact method or a non-contact method. As an embodiment of the present invention, such configuration of the tape streamer drive may also be employed.

Figure 2:
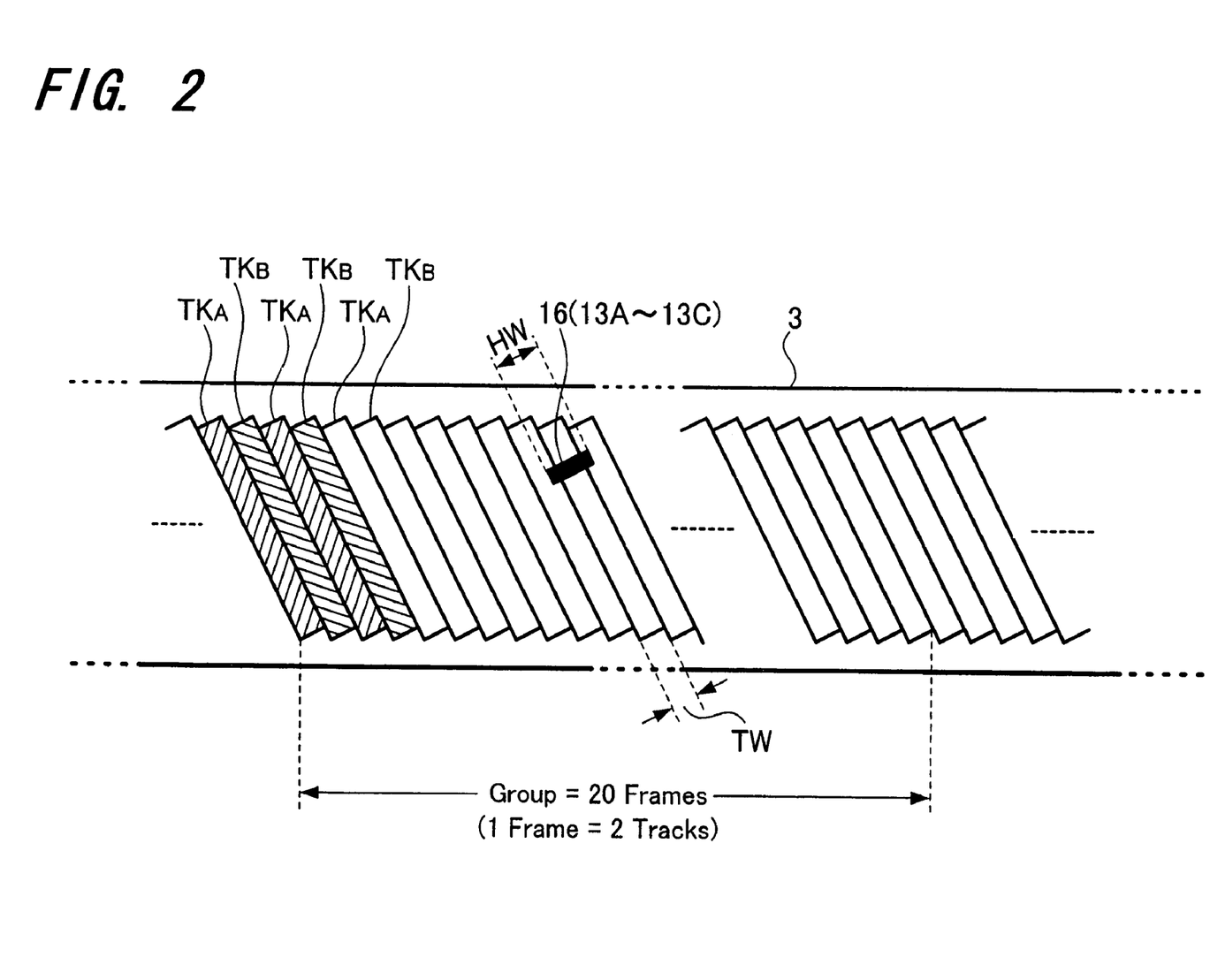
FIG. 2 is an explanatory diagram showing the format of a track recorded on a magnetic tape.

FIG. 2 shows the structure of tracks recorded on the magnetic tape 3 by the above-described, tape streamer drive 10.

Each track is formed using a recording head not shown in the figure as the track having a track width TW by a solid azimuth recording. Adjacent tracks are made to be, reverse azimuth tracks to, each other. In other words, a track TKA having one azimuth direction and a track TKB having the other azimuth direction are—formed alternately.

At the time of the reproduction, tracks' are scanned by the reproducing head 16. Though the head width HW of the reproducing head 16 is wider than the track width TW, crosstalk from the adjacent tracks can be prevented because of the so-called azimuth effect.

In a tape format corresponding to the embodiment of the present invention, a pair of adjacent tracks TKA and TKB is called one frame and 20 frames (40 tracks) constitute a unit called a group.

The above group is made to be a minimum recording unit. Therefore, one recording operation which is called a streaming or a burst can be performed on each group as the smallest unit.

Figure 3:
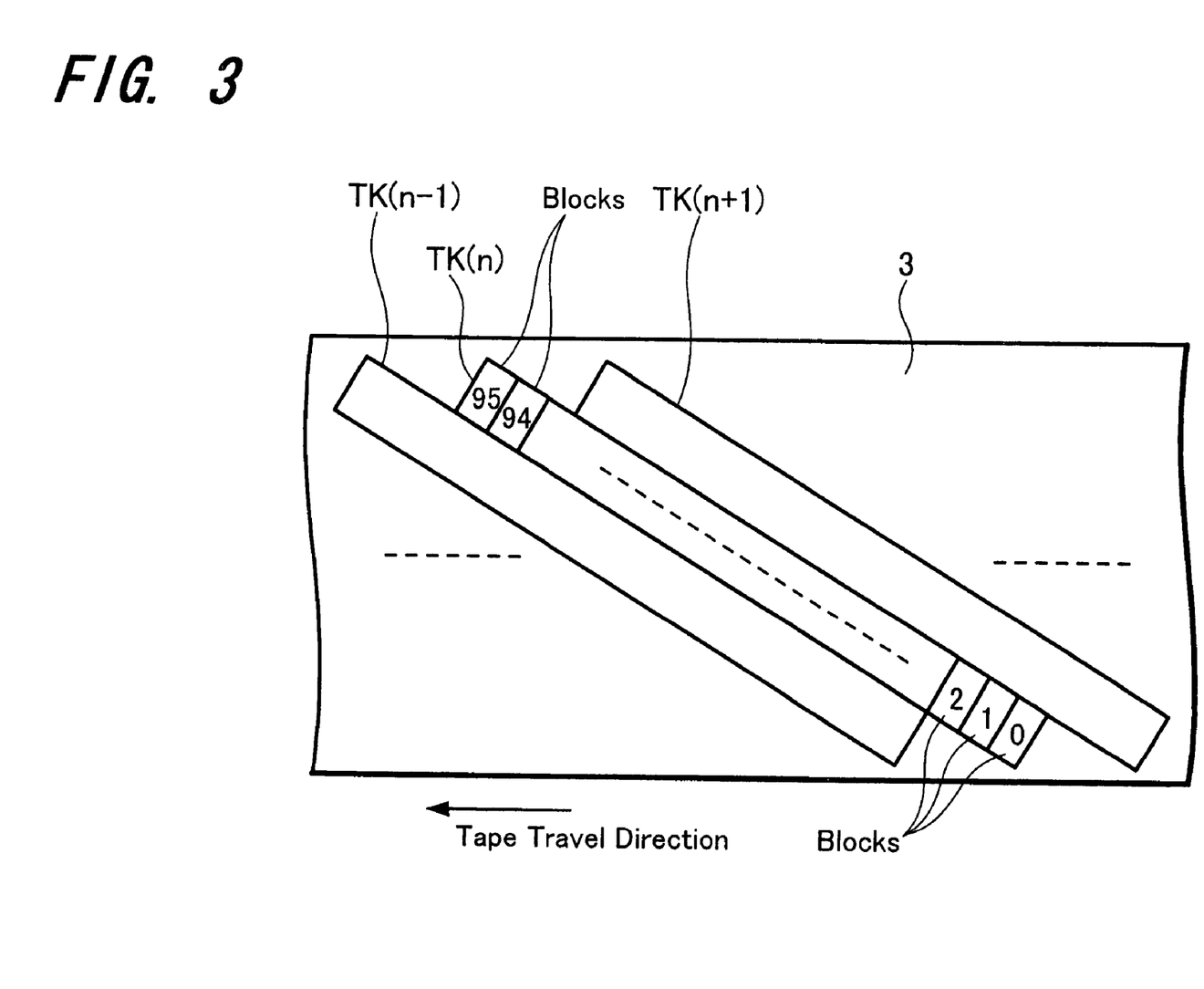
FIG. 3 is an explanatory-diagram schematically showing the data structure of a track.

Also, the data format in each track is shown in FIG. 3.

One track consists of an aggregate of 96 blocks to which a fragment IDs of, for example, 0 to 95 are assigned in sequence. The block has a fixed length of the predetermined data size.

Figure 4:
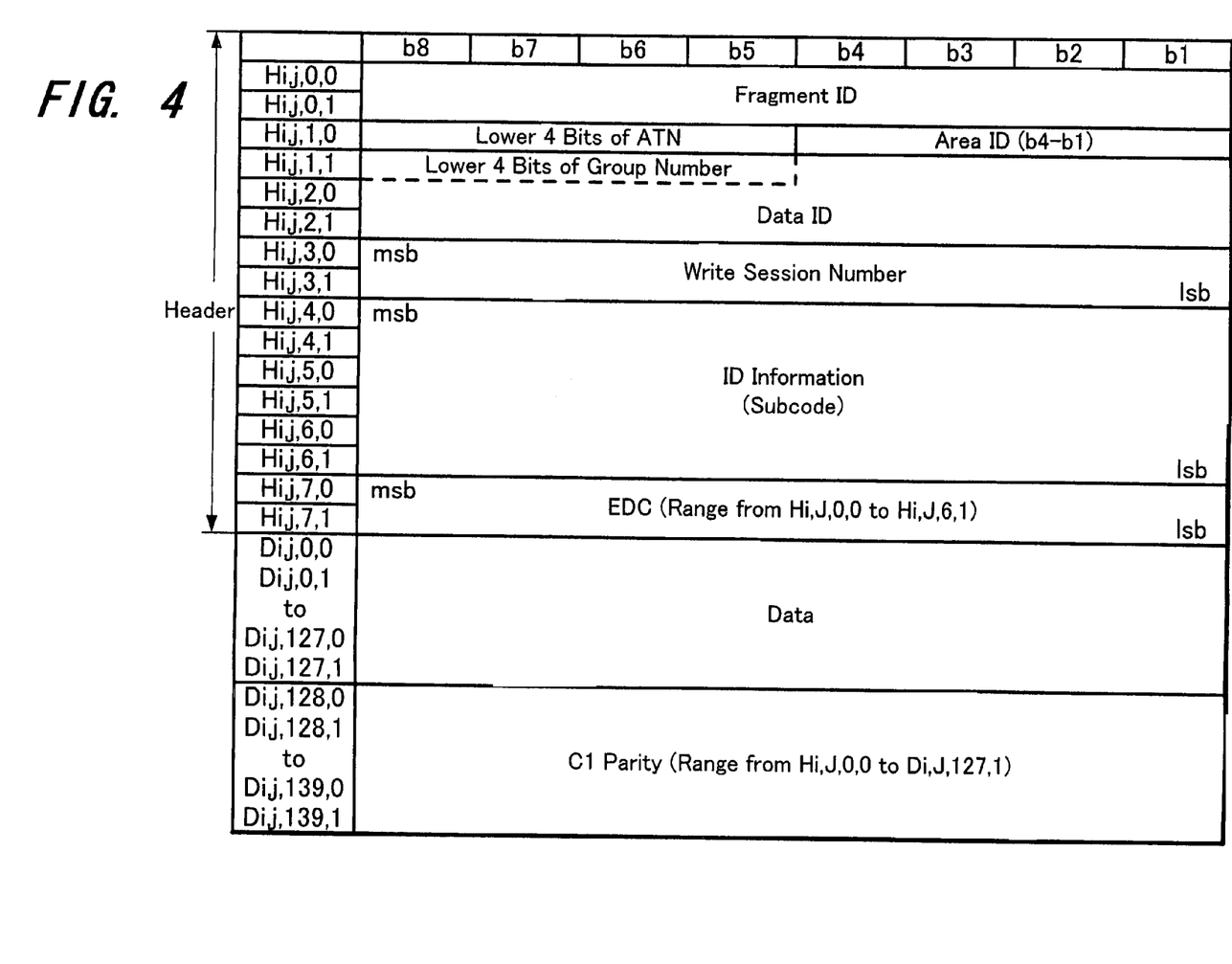
FIG. 4 is a diagram showing a data structure of a block.

A data structure of the block is shown in FIG. 4.

One block consists of, as shown in the figure, a leading header area of 16 bytes; a successive data area of 128×2=256 bytes, and C1 parity area of 12×2=24 bytes. The C1 parity area is an error correction code, for the data in the block.

Though details are not explained here; C2 parity and C3 parity are also defined in the format in the embodiment of the present invention. The C2 parity is an error correction code which concludes within a track unit and the C3 parity is the one which concludes within a group unit.

In the header area of the block shown in FIG. 4, the fragment ID is stored in the area of the leading two bytes (Hi, j, 0, 0/Hi, j, 0, 1).

As shown in FIG. 3, any one of values from 0 to 95 is stored as the fragment ID such that sequential numbers are assigned to respective blocks successively disposed in the track.

Also the value of Lower 4-bit of ATN (Absolute Track Number) is stored in the upper four bits of the third byte (Hi, j, 1, 0). That is, the lower four bits indicate the value of the Absolute Track Number of the track to which the current block belongs.

Further, an area ID is stored in the lower four bits of the third byte (Hi, j, 1, 0). The area ID indicates, depending on the value actually set, that the area to which the current block belongs is, for example, any one of a device area, a reference area, a system area, a data area, and an EOD (an End Of Data) area.

The three-byte area consisting of the fourth byte to sixth byte (Hi, j, 1, 1 to Hi, j, 2, 1) is made to be a logical address area. Then, in the upper four bits of the fourth byte the value of Lower 4-bit of Group Number is stored as the logical address. The lower four bits of the group number indicate the lower four bits of a group number, value indicating the group to which the current block logically belongs.

In the logical address area, a data ID value is stored as the logical address in the area consisting of the remaining lower four bits of the fourth byte, the fifth byte, and the sixth byte. The data ID indicates the logical position of the data in the group to which the current block logically belongs.

A value of Write Session Number is stored in the two-byte area consisting of the seventh byte and eighth byte (Hi, j, 3, 0/Hi, j, 3, 1).

The successive six-byte area consisting of the ninth byte to 14th byte (Hi, j, 4, 0/Hi, j, 6, 1) is assigned as an ID Information (Sub Code) area. One type among a predetermined plurality of types of data is stored in the ID Information area according the predetermined rules stipulated by the format.

Figure 5:
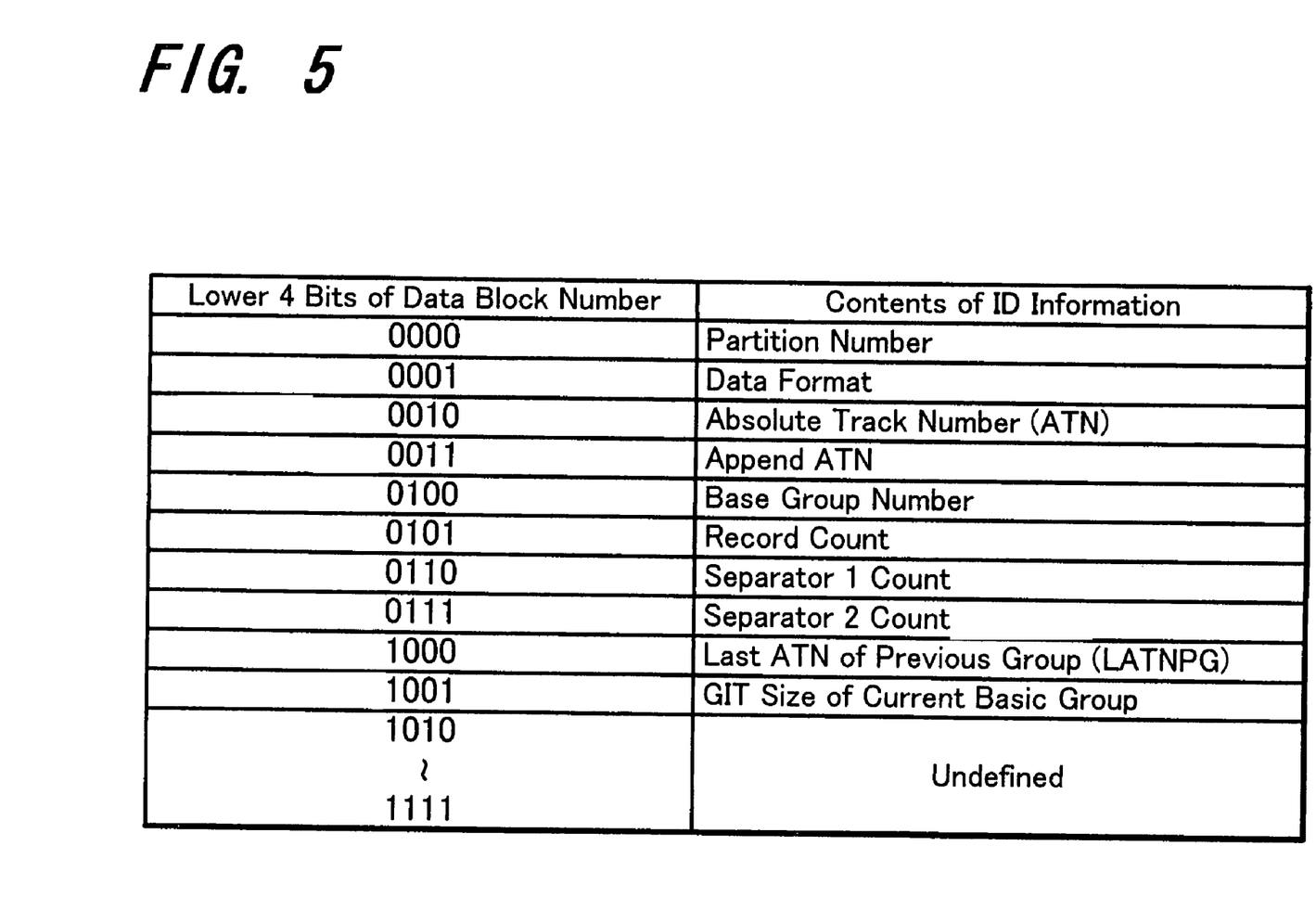
FIG. 5 is a diagram showing the defined contents of information stored in ID Information.

FIG. 5 shows an example of the types of information stored as the above-described ID Information.

According to the figure, the value stored as the ID Information is defined as follows, corresponding to the value of the lower four bits (Lower 4-bit of Data Block Number) of the data block number (fragment ID) of the current block.

In case of Lower 4-bit of Data Block Number=0000, Partition Number is stored in the ID Information so as to identify the partition to which the current block belongs.

In case of Lower 4-bit of Data Block Number=001, Data Format with respect to the current block is stored.

In case of Lower 4-bit of Data Block Number=000, ATN (Absolute Track Number) of the track including the current block is stored.

In case of Lower 4-bit of Data Block Number=0011, the Append ATN value is stored.

In case of Lower 4-bit of Data Block Number=000, the value of Base Group Number is stored. The value of the Base Group Number indicates, as the physical position oh the magnetic tape, the group to which the current block; belongs.

In case of Lower 4-bit of Data Block Number 0101, Record Count is stored. The Record Count indicates' the record number of the current block.

In case of Lower. 4-bit of Data, Block Number=0110, Separator 1 Count is stored.

In case of Lower 4-bit of Data Block Number=0111, Separator 2 Count is stored.

In case of Lower 4-bit of Data Block Number=1000, LATNPG (Last ATN of the Previous Group) is stored. The "Previous Group" means one group prior to the current group to which the current block logically belongs. Also, the LATNPG is a value indicating the last track among the recorded tracks of the data which logically form the "Previous Group".

In case of Lower 4-bit of Data Block Number=1001, the GIT size of the Current Basic Group is stored.

Data block numbers, the lower four bits of which are between 1010 and 1111 are undefined in this figure. However, as the embodiment of the present invention, some additional information is defined by using certain specific Lower 4-bit of Data Block Number out of: those Lower 4-bit Data Block Number=1010 to 1111. Those will be explained hereinafter one by one when necessity arises.

As described above, the type of information stored in the ID information differs according to the data block number. Then, since the information type corresponds together lower four bits of the Data Block Number, each type of ID Information can be stored in the manner of being allocated once for 16 blocks.

In the embodiment of the present invention, since one track consists of 96 blocks, each content shown as the ID Information in FIG. 5 is repeatedly recorded six times within one track as shown by the equation 96/16=6.

Further, as a rule, the information indicated by each information type stored as the ID Information is common to all blocks forming the track which includes the current block. Accordingly, even if each type of information in the ID Information is stored only once in 16 blocks, the information may be applied to all the blocks forming the current track, so: that recorded data can be managed appropriately based on the contents of the ID information.

Moreover, since it is not necessary to store all types of the ID Information in each block, the size of the ID Information for each block does not exceed six bites. In other words, by securing the size of the data area without further increasing the data size of the header area in the block, the redundancy is kept as low as possible. Specifically, the recordable capacity of the user data can be secured with maximum efficiency in a unit amount of data.

Further, in the embodiment of the present invention, with respect to data recorded on the same magnetic tape, tracks having different recording densities can be recorded. In order to change the recording density, it is conceivable that the track width, for example, is changed.

In case of the helical scan method, when the tape running speed is lowered, the track width becomes narrower and the recording density becomes higher on condition that the number of rotation of the rotating drum 11, in which the recording and reproducing heads are provided, is constant. On the contrary, the higher the tape running speed is, the wider the track width becomes to result in the lower recording density.

Figure 6:
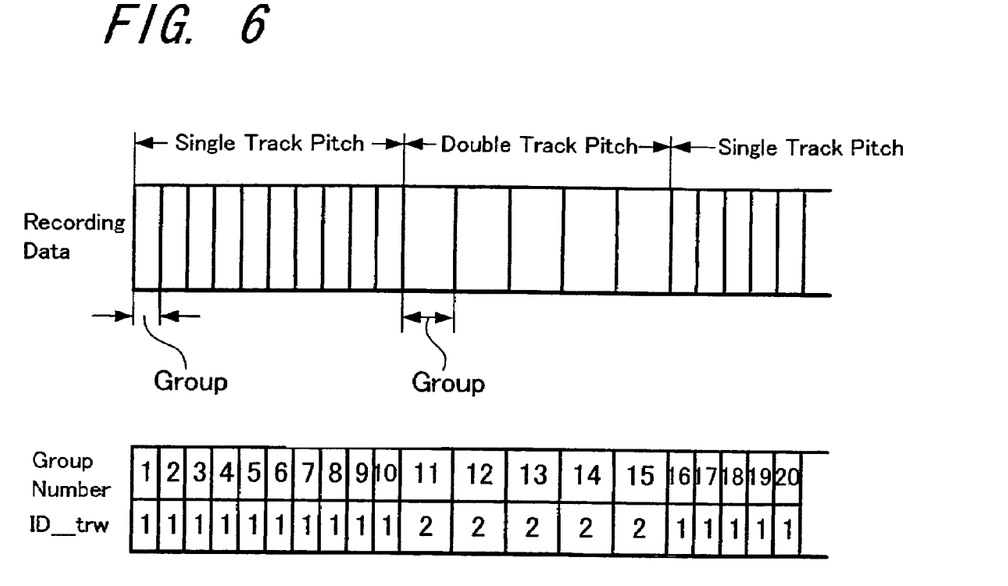
FIG. 6 is an explanatory diagram schematically showing the data recorded on the magnetic tape in the case where a track width is changed to alter a recording density.

When the recording density is thus switched over by changing the track width, the data recorded on the magnetic tape are as shown in FIG. 6, for example. It is noted that FIG. 6 shows an example in which the track width (track pitch) is switched over, between a single track pitch at the standard tape running speed and a double track pitch at the tape running speed of one half of the standard speed. In this case, the recording density becomes lower in the double track pitch than in the single track pitch.

In FIG. 6, each group of Groups 1 to 10 is first recorded as recording data in the single track pitch. Then, successive five groups of Groups 11 to 15 are: recorded in the double track pitch. Further successive Groups on and after 16 to 20, the recording is performed in the previous single track pitch.

Hereupon, the group number shown in this figure is that indicated by the Base Group Number in the ID Information as heretofore described in FIG. 4 and FIG. 5.

Then, in the embodiment of the present invention corresponding to the recording in which the track width is changed as shown in FIG. 6, a track width information. ID_trw, which is the information indicating the track width is made to be stored in the ID Information. The ID_trw is for example, assigned to a value out of the Lower 4-bit of Data Block Number=1010 to 1111 which are left undefined in FIG. 5.

Then, with respect to the track width information ID_trw, when it is defined that ID_trw=1 indicates the single track pitch and ID_trw=2 indicates, the double track pitch, the track width information ID_trw is stored in the following manner regarding the recording data shown in FIG. 6.

Accordingly, ID_trw=1 is stored in each of the tracks forming the Groups 1 to 10. Also, ID_trw=2 is stored in each of the tracks forming the Groups 11 to 15. Then ID_trw=1 is stored in each of the tracks forming the Groups 16 to 20.

Further, in the embodiment of the present invention, the minimum data unit in which the recording density can be changed is, for example, set to be a group. As understood in the above explanation, the group is a data unit in which, for example, C3 parity is concluded and becomes the minimum data unit when the tape streamer drive performs a burst recording (streaming recording) on the magnetic tape. Therefore, in other words, according to the embodiment of the present invention the recording density can not be switched over in the middle of the group by altering the track width, for example.

As described above, in the embodiment of the present invention the track width information ID_trw indicating the track width is made to be stored when the recording is performed in which the recording density is altered by changing the track width. The track width information is regarded as information indicating the recording, density corresponding to the track width. Then, at the time of reproduction, by referring to the track width information ID_trw stored as the ID Information, a track and the track width: (recording density) of the group to which the track belongs are recognized; and then by appropriately a controlling the tape driving system and the like, the reproduction of the data is made possible. Accordingly, when the group indicating the track width information ID_trw=1 is being reproduced, the reproduction from the magnetic tape is performed at a standard tape running speed; and when the group indicating the track width information ID_trw=2 is being reproduced, the reproduction from the magnetic tape is performed at a speed, for example, twice as fast as the standard tape running speed, so that the track having the double track pitch can be appropriately traced to reproduce the data.

Further, in the embodiment of the present invention the recording density of the data recorded on the magnetic tape can be altered by changing a recording linear density of the track.

In the embodiment of the present invention employing the helical scan method; for example, by altering the frequency of the recording data while the number of rotations of the rotating drum 11 is kept constant or, by altering the number of rotations of the rotating drum 11 while the frequency of the recording data is kept-constant, the recording linear density of a track can be switched over.

Then, when the recording density is switched over by altering the track linear density, the recording linear density information ID_LDEN, which is the information indicating the recording linear density of the track is made to be stored in the ID Information. The recording linear density information ID_LDEN is, for example, also assigned to a value out of the lower 4-bit of Data Block Number=1010 to 1111 which is left undefined in FIG. 5.

Hereupon, with respect to the recording linear density information ID_LDEN, ID_LDEN=1 is to indicate the standard linear density and ID_LDEN=2 is to indicate a predetermined linear density which is made to be lower than the standard linear density.

Figure 7:
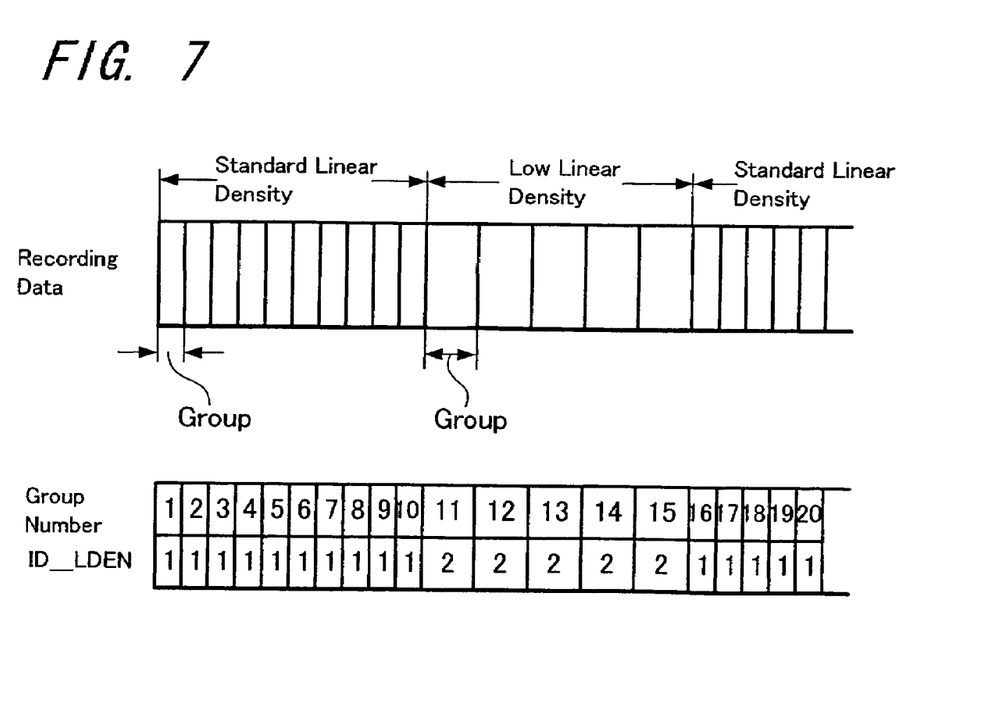
FIG. 7 is an explanatory diagram schematically showing the data recorded on the magnetic tape in the case where a track linear density is changed to alter the recording density.

Then, when the recording density is switched over by changing the track linear density, the recording is performed as shown, for example, in FIG. 7.

In FIG. 7, recording in the standard linear density is performed with respect to each of the tracks forming Groups 1 to 10 and ID_LDEN=1 is stored accordingly in each of the tracks of the Groups 1 to 10. Also, since the recording in the low linear density is performed with respect to each of the tracks forming Groups. 11 to 15, ID_LDEN=2 is stored in each of the tracks in the Groups 11 to 15. Further, since the recording is again performed in the standard linear density with respect to the tracks on and after the Groups 16 to 20, ID_LDEN=1 is stored in each track thereof.

In addition, according to the embodiment of the present invention, when the recording density is switched over by altering the track width as shown, for example, in FIG. 6, the Logical Absolute Track Number LATN and the Physical Absolute Track Number PATN are stored in the ID Information.

The Logical Absolute Truck Number is already defined as the ATN of Lower 4-bit of Data Block Number=0010 shown in FIG. 5. Then, in the embodiment of the present invention, the Physical Absolute Track Number. PATN is defined by assigning a value out of the Lower 4-bit of Data Block Number=1010 to 1111.

Figure 8:
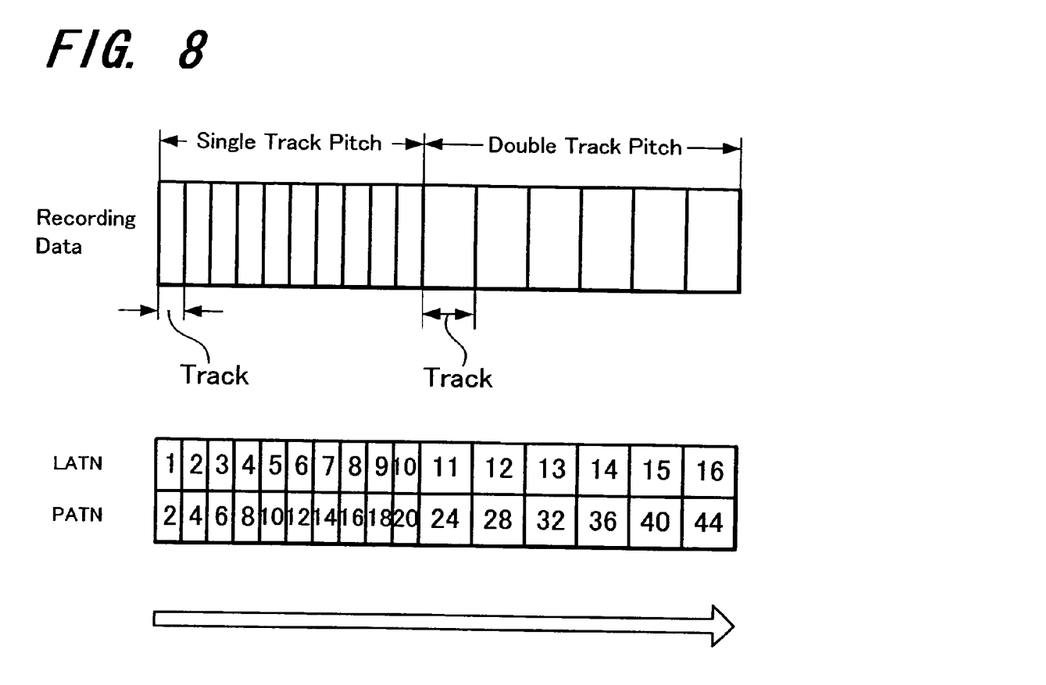
FIG. 8 is an explanatory diagram showing the relationship between a logical absolute track number LATN and a physical absolute track number PATN in the case where the recording density is switched over by changing the track width.

FIG. 8 shows an example of the relationship among the data to be recorded on the magnetic tape, the Logical Absolute track Number LATN, and the Physical Absolute Track Number PATN. Here, a track (also referred to a, reference track) having precisely ½ track width of the standard track width having a single track pitch is assumed, and a value obtained by counting the number of tracks having the reference track width is employed as the Physical Absolute Track Number PATN.

In FIG. 8, ten tracks are first recorded in the single track pitch. Then, each of the Logical Absolute Track Numbers LATN=1 to 10 is made to be respectively stored in each of these tracks.

Subsequently, following the ten tracks in the single track pitch, six tracks are then recorded in the double track pitch. In each of these tracks, each of the Logical. Absolute Track Numbers LATN=11 to 16 is respectively stored.

Then, with respect to the data recorded as described above, the Physical Absolute Track Number PATN is stored in each track as follows. The Physical Absolute Track Number PATN is based on the reference track corresponding to one half of the standard track width. Accordingly, on each of the first ten tracks in a single track pitch, to which the Logical Absolute Track Numbers LATN=1 to 10 are recorded, a; value of the Physical Absolute Track Number is counted up by two such as PATN=2, 4, 6, 8, . . . 20 as the tracks increase.

Then, with respect to each of the successive tracks having a double track pitch to which the Logical Absolute Track Numbers LATN=11 to 16 are stored, the value of the Physical Absolute Track Number becomes the one which counts up by four as the tracks increase such as PATN=24, 28, 32, . . . 44.

According to FIG. 8, since the ten tracks having a single track pitch are recorded followed by the six tracks having a double track pitch, as a result, the total number of the recorded tracks becomes 10+6=16 in the end. In other words, the number of logically recorded tracks corresponds to the Logical Absolute Track Number recorded in the last track. That is, the Logical Absolute Track Number LATN indicates the number of the tracks actually recorded.

On the other hand, the Physical Absolute Track Number recorded in the last track is PATN=44. This value indicates, the total number of absolute tracks hitherto recorded. This means that the physical distance from the start point of, recording is indicated by the Physical Absolute Track Number PATN.

Hereinafter, the procedure for switching over the recording density at the time of recording will be explained.

For example, when the tape running speed is suddenly switched over or when the recording density is made to be altered by switching over the rotation speed of the head, the data frequency or the like during the recording on: the magnetic tape it takes a certain period of time until the speed and the frequency are altered and stabilized. Since the data recorded on the magnetic tape during this transition period are unstable, an recording error may occur and thus it will be difficult to reproduce the data.

Therefore, in the embodiment of the present invention, the following procedure is employed in order to switch over the recording density.

First, according to the embodiment of, the present invention, it is stipulated that the switch-over of the recording density is carried out on a group as the minimum unit. The reason is that, as heretofore described, the group is the minimum unit of the burst recording when recording and reproduction are performed by the tape streamer drive 10 on the magnetic tape.

Figure 9A:
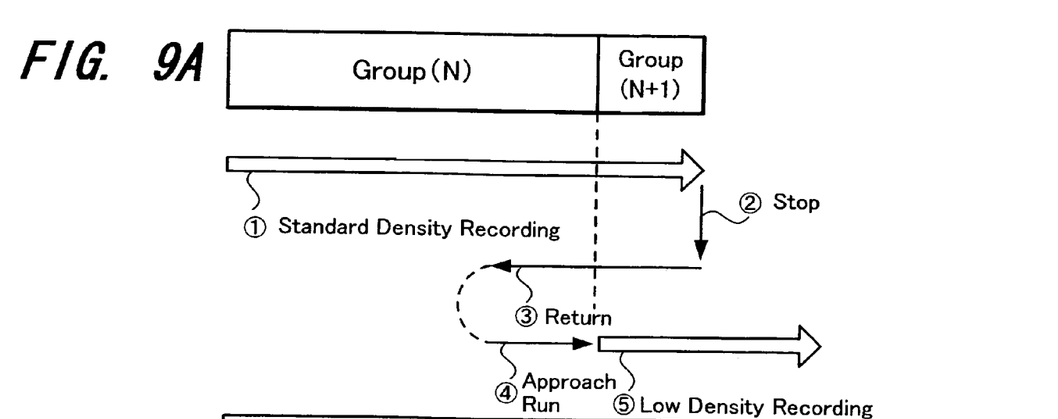
FIGS. 9A and 9B are explanatory diagrams showing an example of a repositioning operation, when the recording density is switched over and recording is performed.
Figure 9B:
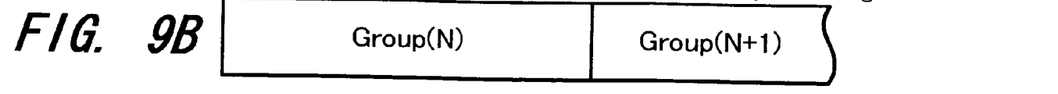

Then, when the switch-over of the recording density is performed, after repositioning is executed as shown in FIG. 9, writing is successively performed. The procedure is hereinafter explained in accordance with the procedure ① to ⑤ shown in FIG. 9.

Procedure ①: as shown, for example, in FIG. 9(A) a Group (N) is being recorded in the standard density. Then a case is studied, in which the next Group (N+1) is recorded in a lower recording density than the standard recording density. In this case, as shown in the figure, the Group (N) is recorded in the standard recording density and the recording in the standard recording density is further performed with respect to the Group (N+1) for a certain period of time without alteration.

Procedure ②: then, at the stage in which the data of the Group (N+1) are recorded for the certain period of time in the standard recording density, the recording operation is once ended and running of the magnetic tape is also stopped.

Procedure ③: after the running of the magnetic tape being stopped, the magnetic tape is made to run in the rewinding direction. Then upon recognition that the magnetic tape is certainly in the recording area of the Group (N), the rewinding of the magnetic tape is stopped.

Procedure ④: here, after setting, for example, the tape running speed, the number of rotation of the head, the data frequency, and the like suitable for the low recording density, the magnetic tape is made to run in the forward direction. That is, an approach run of the magnetic tape is carried out in order to start the low density recording.

Procedure ⑤: when the magnetic tape reaches the start position of the Group (N+1) by the above-described approach run in the procedure ④, the recording is thereafter started in the low recording density. Thus the Group (N+1) is recorded in the low recording density.

In addition, when the recording density is actually changed, the inclination of a track on the magnetic tape is also altered. Specifically, for example, in the case where the recording density is changed by having the track width made to be variable, when the track width is for example, made twice as wide as the standard width so as to lower the recording density, the tape running speed is accelerated to the corresponding extent. The higher the tape-running speed is, the more the track on the magnetic tape inclines toward the horizontal direction.

Then, in the embodiment of the present invention, when writing of the data is successively performed, in order to change the recording density as shown, for example, in FIG. 9, the writing is made to perform as explained hereunder, considering the track inclination which alters depending upon the recording density.

Figure 10A:
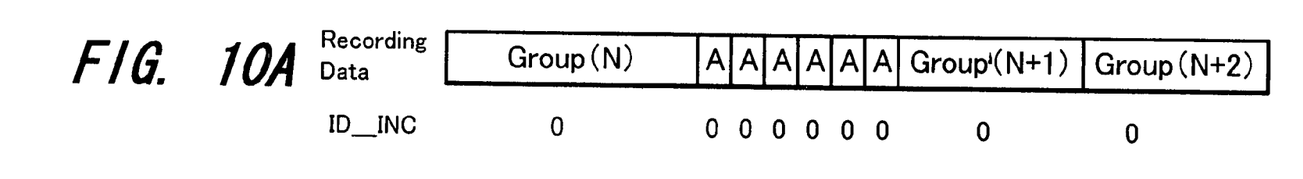
FIGS. 10A to 10C are explanatory diagrams showing an example of successive writing operation corresponding to the change of a track inclination angle.

FIG. 10(A) shows the case where data of three successive groups of Group (N), (N+1) and (N+2) are, for example, recorded in standard recording density. Also, tracks called an amble are formed between the Group (N) and the Group (N+1) A plurality of amble tracks are provided between, for example, the front and rear groups that are next to each other to function as a buffer area between these groups, and six tracks are successively formed in FIG. 10(A).

Also, track inclination information ID_INC is shown in FIG. 10(A). The track inclination information ID_INC is the information stored as the ID Information to which a value out of the Lower 4-bit of Data Block Number=1010 to 1111 is assigned. Then, herein ID_INC is defined as follows:

ID_INC=0 The standard track inclination angle;

ID_INC=1 The track is inclined by one track width in the horizontal direction;

ID_INC=2 The track is inclined by one track width in the vertical direction.

Therefore, FIG. 10(A) shows that all the recorded tracks have the standard track inclination angle.

Then, the case is studied in which after obtaining the recorded status as shown in, for example; FIG. 10(A), successive writing is performed in order to overwrite the data on and after the Group (N+1) while the data in the Group (N) remain unchanged.

Figure 10B:
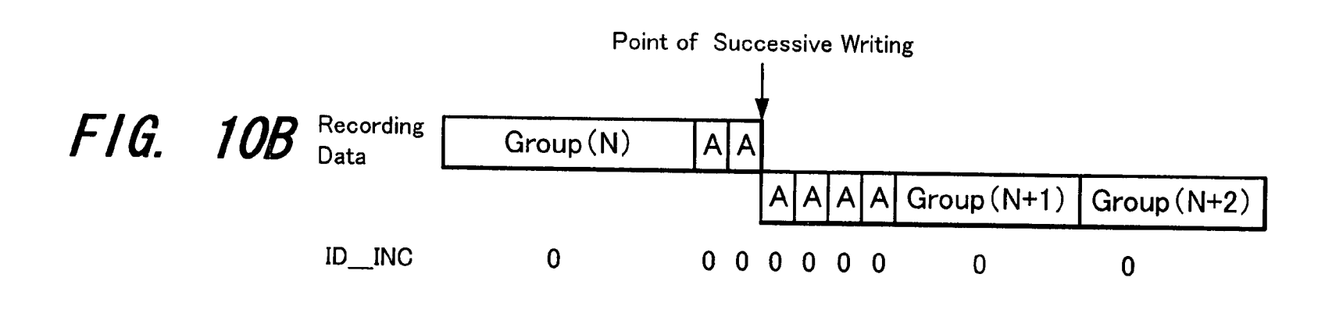

Hereupon, in the case where data to be successively written are also recorded in the standard recording density having, therefore, the standard track inclination angle, successive writing is performed as shown in FIG. 10(B).

Specifically, in such a case, successive writing starts at the third amble track from the end of the data in the Group (N) while leaving two old amble tracks. Then, in this case; after writing four amble tracks, the actual data on and after the Group (N+1) will be recorded.

Further, in this case, with respect to the track inclination information ID_INC on newly recorded data on and after the start point of successive writing, since the newly recorded data have the same track inclination angle (recording density) as that of the previously recorded data; the track inclination information ID_INC=0 will be stored similarly to the tracks before successive writing.

Figure 10C:
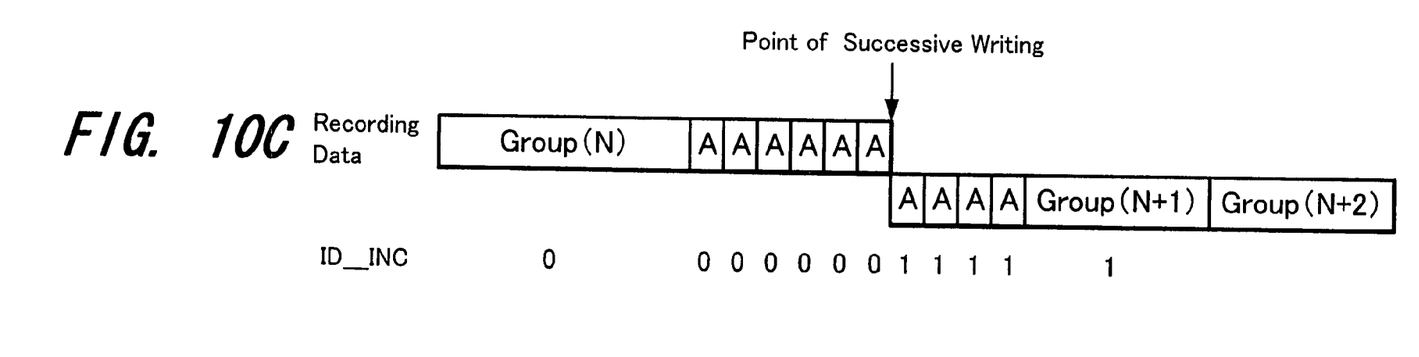

On the other hand, when data are successively written in a different recording density from that of the previously recorded data, successive writing will be started while leaving more old amble tracks than those shown in FIG. 10(B). In other words, the position after leaving six old amble tracks is set to the start point of successive writing as illustrated in FIG. 10(C). Then, after the start point of successive writing, four amble tracks, for example, are first recorded and then the recording of the actual data on and after the Group (N+1) will be performed similarly to the case shown in FIG. 10(B).

However, in this case, the amble tracks and the data in the groups on and after the point where successive writing starts are recorded in the different recording density from that of the data before the start point of successive writing. Therefore, the track inclination angle is also different from that of the track before the start point of successive writing.

In FIG. 11(C), data on and after: the start point of successive writing are recorded in the low recording density, and accordingly ID_INC=1 is stored as the track inclination information.

When successive writing is performed with the recording density being changed, assuming that the recording starts with leaving, for example, only two amble tracks as shown in FIG. 10(B), there may occur the case in which the last part of the data in the Group (N) is overwritten and erased when new amble tracks are written, because the track inclination is different from that hitherto recorded.

Accordingly, as explained in FIG. 10(C), when the start point of successive writing is decided with more amble tracks being left, such inconvenience as the last part of, the data in the Group (N) is overwritten and erased does not arise.

Further, the number of amble tracks left when the start point of successive writing is decided should be decided in the following manner. Specifically, based on the difference between the track inclination angle corresponding to the recording density before the start of successive writing and; the track inclination angle corresponding to the recording density after the start of successive writing, the number should be set in view of securing enough physical distance so as not to overwrite on the data of the last group before the start of successive writing.

Then, in the embodiment of the present invention, the tape streamer drive 10 is to change the recording density in accordance with the quality of the recording data. In, other words, when the quality of the recording data is monitored and found to be lower than the predetermined level, the recording density is switched, over to a lower one than before. Also, when the quality of the recording data returns to the predetermined level or higher than that level during the recording under the condition where low recording density is applied, a higher recording density is set.

Figure 11:
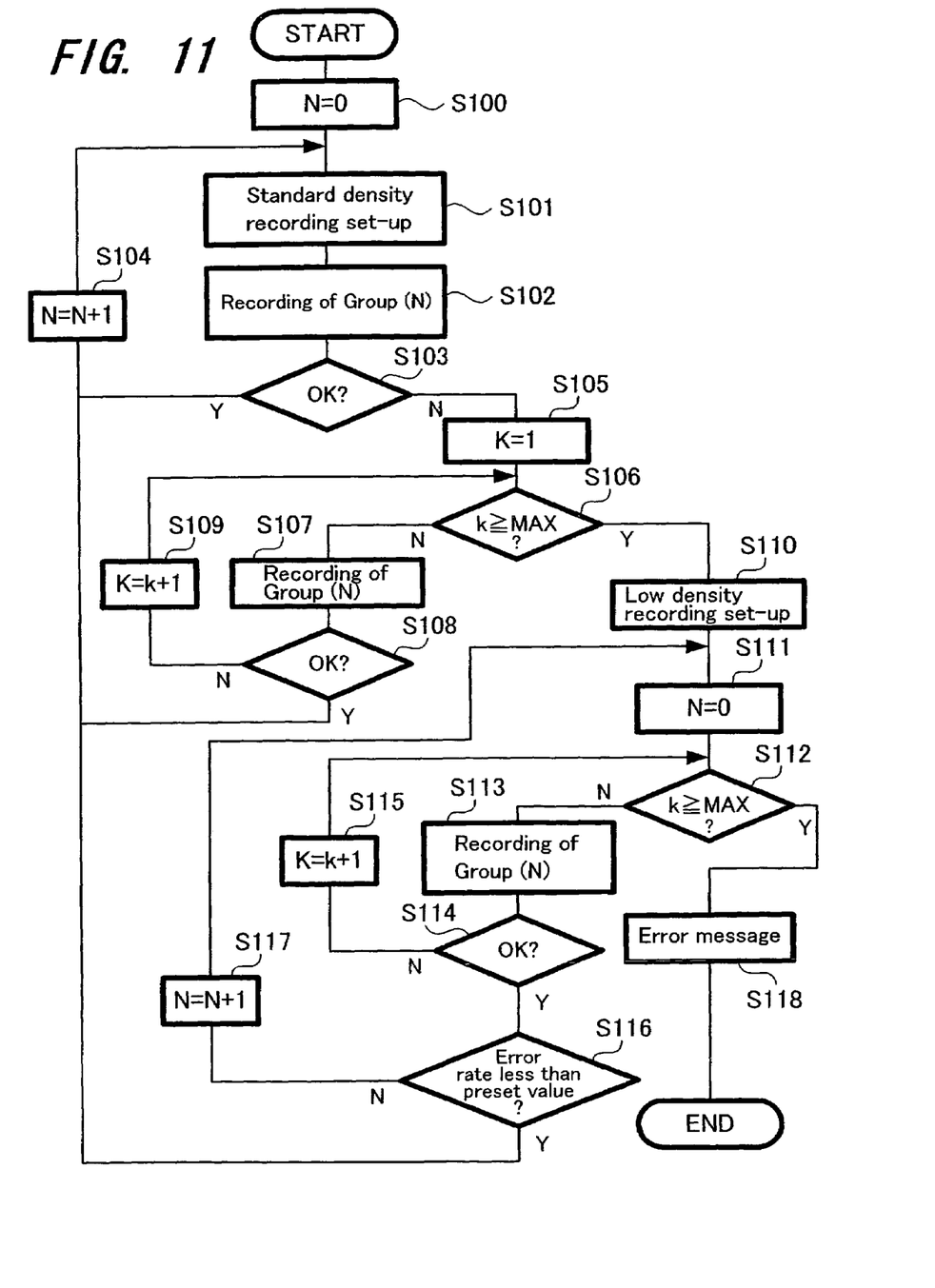
FIG. 11 is a flow chart showing the processing, operation of the tape streamer drive to switch over the recording density.

FIG. 11 shows an example of a processing operation performed by the tape streamer drive 10, in which the recording density is switched over; in accordance with the quality of the recording data as described above.

Here, the processing shown in FIG. 11 is executed by the system controller 15 in the tape streamer drive 10. Also, the processing shown in this figure is an example in which the switch-over is carried out between two recording densities: a standard recording density (high recording density) and a lower recording density which is lower than the standard density.

The processing shown in this figure is as follows: for example, when the recording on the magnetic tape is started, N=0 is first set with respect to the variable N at a step. S100. The variable N indicates the number of groups (group number) to be hereafter recorded on the magnetic tape. Then, at the next step S101, the various parameters are set so as to perform the recording in the standard recording density. At this step, in case that the switch-over of the recording density is carried out by altering the track width, tape running, speed and the like are set so as to perform the recording in the standard track width (single track pitch). Also, as the processing of the recording data, forming data in a block is performed such that a value indicating, for example, the single track pitch is stored as the track width information ID_trw previously explained in FIG. 6.

Then, in the state in which the setting for the standard recording density is carried out, as shown at a step S102, the data in the Group (N) are recorded on the magnetic tape. It is understood from the explanation as described above the recording of data corresponding to the Group (N) is performed in such a manner as to sequentially form the tracks.

In this case, the judgment is then made at the next step S103 whether the recording of the data: at the above step S102 is OK or not. The judgment at the step S103 can be carried out based on the result of reading and checking of the recorded data by an RAW operation, for example.

In case that the judgment result of OK is obtained at the step S103, the variable N is incremented as N=N+1 at a step S104 and the data in the new Group (N+1) are recorded by returning to the processing of the step S101 and proceeding to the step S102.

As described above, as long as the judgment result, of the data recording on the magnetic tape is OK, the processing of the steps S101→S102→S103→S104 is repeated and accordingly the data recording on the group unit basis is continued in the standard recording density.

On the other hand, in case that the result of the data recording is judged to be NG at the step S103, the processing proceeds to a step on and after S105.

At the step S105, a variable k indicating the number of retry is set to k=1. Also, at the next step S106, the judgment is made whether the relationship k≧MAX (maximum value) is satisfied with respect to the present value of the variable k and the predetermined maximum value MAX.

In case that the negative result: is obtained at the step S106, processing proceeds to a step S107 and the recording of the Group (N) is performed. Here, for example, when processing reaches the step, S107 for the first time through each processing of the steps S105→S106, the first retry is performed with respect to the Group (N). It should be noted that the data recording at the step S107 is performed based on the standard recording density.

Then, the judgment is made at the next step S108 whether the data recording of the Group (N) at the step S1107, is OK or not.

If the judgment result of OK is not obtained at the step S108 with respect to the result of the data recording, increment k=k+1 of the variable k is performed at a step S109 to return to the processing at the step S106. With the each processing at the steps S106, S107, S108 and S109, retry is thus performed on the data recording of the Group (N) Then, when the judgment result of OK is obtained at the step S108 as the result of carrying out the retry, processing is returned to the step S101 through the processing at the step S104.

When the number of retry k reaches the maximum value (MAX) while the retry operation is repeated in the processing at, for example the steps S106, S107, S108, and S109, the affirmative result is obtained at the step S16. The affirmative result obtained at the step S106 shows that the status is such that an error has occurred in the recorded data to the degree that the quality of the data required to recording can not be maintained in the standard recording density.

Then, when the affirmative result is obtained at the step S106, the processing is to proceed to steps on and after S110.

At the step S110, the internal parameter setting is switched over so that the low density recording can be performed. Then at the next step S111 k=k+1 is newly set with respect to the variable k indicating the number of retry, and processing of steps on and after S113 are executed, unless k≧MAX is obtained at the step S112. At the step S113, the recording of the Group (N) is performed. The data are recorded at the step S113 in the low recording density in accordance with the setting at the previous step S110.

Then, the judgment is made at a step S114 whether the result of the data recording at the above-described step S113 is OK or not, and in the case where the judgment result is not OK, retry is performed in the low recording density That is, the data in the same Group (N) are written again on the magnetic tape in the low recording density. In other words, the processing at the step S113 is executed again, after the increment k=k+1 is performed at the step S115 and; the judgment at the step S112 that k≧MAX is not obtained.

Then, after the judgment at the step S114 that the result of the data recording of the Group (N) is, OK, processing is to proceed to the step S116.

It is also made possible for the tape streamer drive 10 to detect an error rate of the recorded data with the RAW operation, for example. Further, the judgment is made at the step S116 whether the error rate was less than the predetermined level or not, based on the result of monitoring of the error rate detected during the data writing of the Group (N) by the processing of, for example, the step S113 which is carried out latest at present.

Then, when the judgment is made that the error rate is higher than the predetermined level, processing is returned to the step S111 after increment of N=N+1 is performed with respect to the variable N at a step S117. This processing is performed in order to continue the recording of the next group in the low recording density. In other words, the data recording is made to continue in the low recording density, in case that the error rate is not improved though the data recording has been made possible by switching, over to the low recording density.

On the other hand, when the judgment is made at the step S116 that the error rate is less than the predetermined level and the quality of the recorded data is excellent, each processing on and after the step S101 is executed after the increment N=N+1 is performed through the processing at the step S104.

Specifically, when the error rate is improved to be less than the predetermined level at the data recording in the low recording density, again the recording in the standard recording density is resumed.

Further, the case in which the affirmative judgment result of k≧MAX is obtained at the step S112 means that the recording error is not eliminated even when retry in the low recording density is repeated. In such a case, the processing shown in this figure is terminated after outputting an error message as described at, for example, a step S118.

Furthermore, the above-described processing operation shown in FIG. 11 is merely one example. For example, though in the above-described processing operations an example is illustrated in which the recording density is switched over between two stages of recording densities that are the standard recording density and the low recording density which is lower than the standard density, an configuration in which, for example, three or more stages of recording densities can be appropriately switched over in accordance with the number of retry and the error rate is possible. Also, though in the above-described processing operations the standard recording density is set as the maximum; recording density, it can be made possible to switch over to a higher recording density than the standard recording density.

Also, the recording-reproduction apparatus to which the present invention is applied is not limited to the configuration of the tape streamer drive 10 which is shown, for example, as the embodiment of the present invention. For example, the present invention can be applied to an apparatus, in which data recording is performed onto a magnetic tape on the track unit, basis and the data correspond to such a format in which a unit of the recording data equivalent to a group is defined by data corresponding to a predetermined number of tracks.

According to the present invention as described above, it is, possible to record data on the magnetic tape in various recording densities, and to record the information with respect to the recording density (recording density related information) in the data recorded on the magnetic tape.

Specifically, according to the present invention, it is possible to record the data in various recording densities on the same magnetic tape as the format to record the data on the magnetic tape. Further, the recording, and reproduction can be appropriately managed by referring to the recording density related information, even if the data recording is thus performed in various recording densities.

By employing the configuration as described above, the present invention can provide a higher flexibility with respect to the recording density for the format of the data recorded on the magnetic tape.

Moreover, the recording apparatus in which data are recorded on the magnetic tape is configured such that the data recording can be made possible by altering the recording density according to the quality of the recording data which is indicated by, for example, the error rate, the number of recording error, and the like.

Since, the recording apparatus is thus configured it becomes possible to record data without an error by switching over to a lower recording density, when the data writing is not possible due to, for example, the recording error. Particularly, when the recording error occurs due to, for example, the deterioration of S/N of the recording data or the like, the recording error is not easily salved even if retry is performed in the same recording density. In such a case, there is a high possibility that the recording error can be solved efficiently by switching over the recording density as described in the present invention. Therefore, the reliability of data recording operation can be improved compared to the case where the recording is performed in the fixed recording density.

The invention claimed is:

1. A method for recording data onto a magnetic tape on a track unit basis by employing a helical scan method using rotary heads, the recording method comprising the steps of:
   recording data judgment processing in which the quality of recording data is judged; and
   recording control processing in which according to the judgment result of said recording data judgment processing the recording density of the track is changed to record data on the magnetic tape, when the recording is performed,
   wherein recording-density related information is recorded in each track and includes track width information for each track, and
   reference track count information which is a counted value obtained by counting reference tracks each having a reference track width is included in said track width information.

2. A recording method according to claim 1, wherein in said recording control processing a plurality of tracks corresponding to one burst recording are recorded in the same recording density.

3. A recording method according to claim 1, wherein when the recording density of the track is altered, in said recording control processing data are recorded such that: after repositioning to a position prior to a changed recording position where the recording density is changed to perform the recording is carried out on the magnetic tape, successive writing starts from said changed recording position.

4. A recording method according to claim 1, wherein in said recording control processing, said recording density is altered by recording a track having a different track width, and tape running speed is controlled such that a second tape running speed is higher than a first tape running speed, with respect to the first tape running speed at which recording is performed with a first track width and the second tape running speed at which recording is performed with a second track width that is wider than the first track width.

5. A recording method according to claim 1, wherein in said recording control processing, said recording density is altered by recording a track having a different track linear density, and when the track linear density is changed, a frequency of the recording data is made to be variable while a rotation speed of the rotary heads is approximately constant; or the rotation speed of the rotary heads is made to be variable while the frequency of the recording data is approximately constant.

6. A recording apparatus in which data are recorded onto the magnetic tape on a track unit basis using rotary heads, the recording apparatus comprising:

recording data judgment means for judging the quality of recording data; and recording control means for enabling tracks having various recording densities to be recorded in accordance with the judgment result of said recording data judgment means, and for recording at least recording-density related information relating to the recording density in each track, and reference track count information, which is a counted value obtained by counting reference tracks having a reference track width.

7. A recording apparatus according to claim 6, wherein said recording control means performs recording in the same recording density with respect to a plurality of tracks corresponding to one burst recording.

8. A recording method according to claim 6, wherein when the recording density of the track is altered, said recording control means performs data recording such that: after repositioning to a position prior to a changed recording position where the recording density is changed to perform the recording is carried out on the magnetic tape, successive writing starts from said changed recording position.

9. A recording apparatus according to claim 6, wherein said recording control means alters said recording density by recording a track having a different track width; and controls tape running speed such that a second tape running speed is higher than a first tape running speed, with respect to the first tape running speed at which recording is performed with a first track width and the second tape running speed at which recording is performed with a second track width that is wider than the first track width.

10. A recording apparatus according to claim 6, wherein said recording control means alters said recording density by recording a track having a different track linear density, and when the track linear density is changed, said recording control means makes a frequency of the recording data variable while a rotation speed of the rotary heads is approximately constant, or makes the rotation speed of the rotary heads variable while the frequency of the recording data is approximately constant.

* * * * *